United States Patent [19]

Murauskas et al.

[11] 4,028,248

[45] June 7, 1977

[54] FLUID FILTER

[75] Inventors: Donald J. Murauskas, Painesville; Edward E. Kish, Jr., Kirtland; Frank M. Cunningham, Solon; Bernard J. Gallagher, Mayfield; Earl D. Shufflebarger, Mentor, all of Ohio

[73] Assignee: Nupro Company, Willoughby, Ohio

[22] Filed: July 10, 1975

[21] Appl. No.: 594,613

[52] U.S. Cl. .................................. 210/232; 55/270; 55/481; 55/493; 210/435; 210/445; 210/447; 210/448; 210/450; 210/451; 210/452; 210/463

[51] Int. Cl.² ........................................ B01D 25/02

[58] Field of Search .......... 210/447, 448, 450, 451, 210/452, 453, 446, 463, 232, 236, 435, 445, 451; 55/481, 493, 270, 478, 480, 490, 492, 495, 501, 502, 506, 510, 511, 516, 518, 519

[56] References Cited

UNITED STATES PATENTS

| | | | |
|---|---|---|---|
| 1,509,718 | 9/1924 | Depotie | 210/435 |
| 1,680,323 | 8/1928 | Culver | 210/446 |
| 1,784,622 | 12/1930 | Dardani | 210/437 |
| 1,802,423 | 4/1931 | Hemmingsen | 210/446 |
| 3,170,872 | 2/1965 | Balogh et al. | 210/446 |
| 3,240,342 | 3/1966 | Callahan et al. | 210/447 |
| 3,483,986 | 12/1969 | Wright | 210/232 |
| 3,493,115 | 2/1970 | Koches | 210/447 |
| 3,516,688 | 6/1970 | Gachot | 210/448 |
| 3,788,484 | 1/1974 | Godin | 210/447 |
| 3,877,895 | 4/1975 | Wonderland et al. | 210/447 |

Primary Examiner—Frank W. Lutter
Assistant Examiner—Frank Sever
Attorney, Agent, or Firm—Fay & Sharpe

[57] ABSTRACT

The specification and drawings disclose a fluid filter device which includes a central body section clamped between a pair of end fittings by a plurality of longitudinally extending tie bolts. The tie bolt arrangement is such that only one bolt must be removed to permit the central body section to be swung out of position between the end fittings for filter cleaning, changing, or the like. The central body section includes a cylindrical through passage which extends longitudinally of the body perpendicularly to end faces which mate with the end fittings. A filter cartridge is received in the through passage and includes a cylindrical sleeve which is sized so as to be closely and slidably received in the passage. Filter elements are mounted within the sleeve. Additionally, seal rings are carried about the opposite ends of the sleeve to provide a fluid seal between the end fittings and the central body, as well as to prevent leakage between the outside of the sleeve and the wall of the passageway.

9 Claims, 9 Drawing Figures

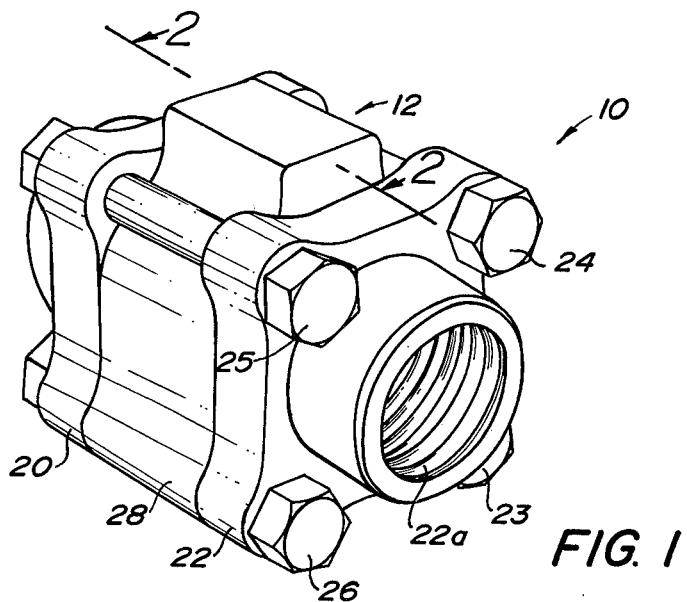
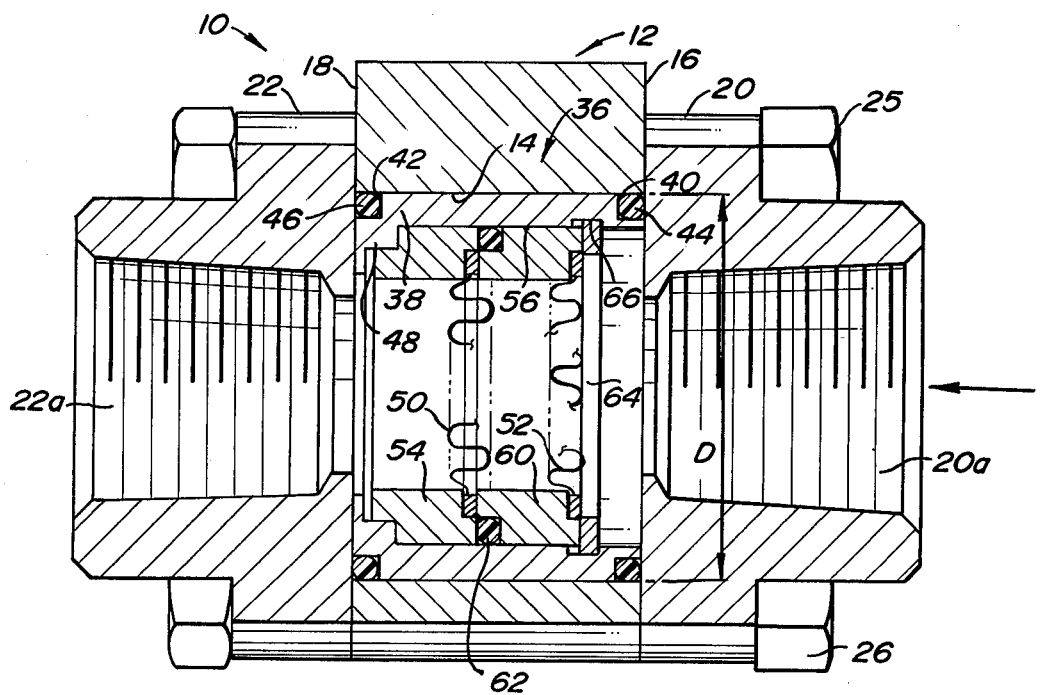

FLUID FILTER

The subject invention is directed toward the art of fluid filters and, more particularly, to a filter or strainer device especially suited for use in fluid process systems.

The primary object of the invention is the provision of a fluid filter device wherein the filter elements can be rapidly removed for cleaning or replacement without disconnecting the device from the associated piping.

As is well known, many different types of filter elements are required for different fluids and process systems. Additionally, the filter elements must often be removed for cleaning or replacement. The subject invention provides a fluid filter device which is arranged so that the filter element or elements can be quickly removed and replaced. Moreover, the device is such that the filter element itself can be mounted in the device for fluid flow in either direction. That is, the filter body or housing can have the filter element mounted for flow in either direction through the housing.

In accordance with the invention, the fluid filter comprises a main body member having oppositely disposed, generally planar end faces. A cylindrical through-passage extends through the main body portion between the end faces. Preferably, but not necessarily, the through-passage is perpendicular to the end faces. Positioned adjacent to the main body at opposite ends of the through-passage are a pair of end fitting members which allow the device to be connected to associated piping or tubing. Each of the end fitting members has a through-opening generally aligned with the through-passage to define inlet and outlet openings. Releasable connecting members extend between the end fittings to releasably clamp the end fittings to the main body member. Preferably, the releasable connecting members are tie bolts which pass through aligned openings in the end fittings. Preferably, but not necessarily, only one of the tie bolts passes through an opening in the main body member. The remaining tie bolts pass exteriorly of the body member and are located so that by removal of one of the exterior bolts, the entire main body can be pivoted or swung out from its position between the end fittings. The device also includes a filter cartridge which is positioned in the through-passage. The cartridge comprises a hollow, open-ended sleeve with an outer diameter sized to be closely and slidably received in the passage. The length of the sleeve is preferably no greater than the length of the through-passage. At least one fluid filter element is mounted in the sleeve and positioned such that all fluid passing through the sleeve must pass through the filter. Seal elements are positioned circumferentially about the ends of the sleeve and located to provide a fluid seal between the exterior of the sleeve and the interior of the through-passage. Additionally, the seals are located such that they also provide a fluid seal between the end fittings and the main body member.

Preferably, and in accordance with a more limited aspect of the invention, the sleeve includes circumferential recesses formed about its opposite ends and the seal elements comprise O-rings positioned in the recesses and sized to extend outwardly of both the end faces and the external surface of the sleeve.

As can be appreciated, the cartridge member can simply be a sleeve whose outer surface is generally symmetrical about both the longitudinal and a transverse axes. This allows the sleeve to be inserted into the flow passage in either direction such that it can filter fluid flow through the device from either direction.

Additionally, because of the manner in which the cartridge is arranged and positioned in the main body, it is simple to change or clean the cartridge. Merely by removing the previously-mentioned tie bolt and swinging the main body out, the cartridge can be slid out of the main body from either end. It is not necessary to remove any other connecting elements or the like.

The above and other objects and advantages will become apparent from the following description when read in conjunction with the accompanying drawings wherein:

FIG. 1 is a pictorial view showing a preferred embodiment of a fluid filter device incorporating the subject invention;

FIG. 2 is a longitudinal, cross-sectional view of the device shown in FIG. 1;

Figure 3:
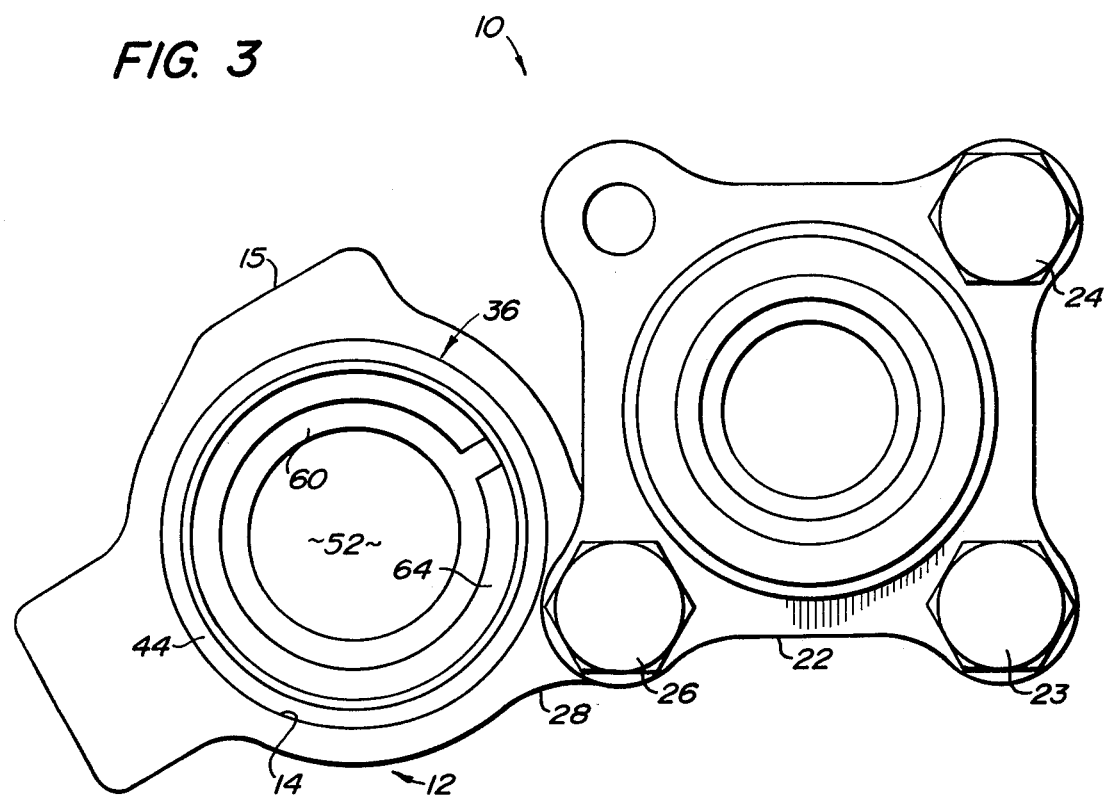
FIG. 3 is an end view of the device shown in FIG. 1 (the main body is shown swung out to a cartridge removing position); and, FIGS. 4–9 are cross-sectional views through alternate embodiments of filter cartridges which could be used in the device of FIG. 1.

Referring more particularly to FIGS. 1–3, the overall arrangement of the fluid filter device 10 is illustrated as comprising a main central body portion 12 having a central throughpassage 14 which extends generally perpendicularly between planar and parallel end faces 16 and 18. A pair of end fitting members 20 and 22 are releasably connected to the main body portion 12 by four tie bolts 23–26.

Preferably, the main body portion 12 is formed from an extrusion having the cross-sectional shape best illustrated in FIG. 3. As can be seen, the central through-passage 14 is cylindrical and has its longitudinal axis located generally centrally of the extrusion. The extrusion is shaped so that only one ear or tab-like portion 28 is located such that a tie bolt passes therethrough. As illustrated, tie bolt 26 passes through both end fittings and the central or main body portion 12. The end fittings 20 and 22 are also formed from extrusions and preferably have an identical configuration. Moreover, each of the end fittings are provided with means to permit them to be connected to associated tubing or piping. In the subject embodiment, each end fitting includes a central opening located to be in general alignment with the through-passage 14 of the main body portion 12. The openings are identified by the numerals 20a and 22a. It should be noted that they are shown as having standard pipe threads for connection to fluid pipe lines. However, it should be understood that other types of connecting means could be provided.

In the embodiment shown, the central body portion 12 can be pivoted and swung out to the position shown in FIG. 3. Merely by loosening the tie bolts 23, 24 and 26, and removing tie bolt 25, the central or main body section is freely pivotable outwardly in the direction shown. In this position, the filter cartridge 36 can be freely slid from within the through-passage 14.

Referring again to the main body portion 12, FIGS. 2 and 3 best illustrate the cross-sectional shape of the body portion 12. It should be noted that the combination of a flat 15 on one side and the boss or tab portion which receives tie bolt 25 provides a holding surface for a pipe wrench. The assembled filter unit can thus be held securely by the wrench during tightening and loosening of the clamp bolts. Without the boss for protection, a pipe wrench on the central body portion 12 could bend the bolts while tightening a bolt into the end fittings. This could weaken the bolts and create danger of bolt failure under internal pressure.

As previously mentioned, several specific filter cartridge units can be used in the device thus far described. However, as will become apparent, certain characteristics are preferred for all of the filter cartridges. These characteristics will become apparent from the following description. In the specific embodiment shown in FIGS. 1–4, the details of cartridge 36 can best be understood by reference to FIG. 2. In particular, the cartridge includes a hollow cylindrical sleeve member 38 formed from any suitable fluid impervious material. The particular material used for the sleeve would, of course, depend upon the properties of the fluid being handled, etc. The overall diameter D of the sleeve 38 is preferably only slightly less than the internal diameter of the through-passage 14. This allows the cartridge to be freely slidable within the through-passage 14. Additionally, the ends of the sleeve 38 are provided with circumferential recesses 40 and 42 which receive seal members 44 and 46. In the embodiment under consideration, the seal ring members 44 and 46 are conventional, resilient O-rings. However, it should be understood that other types of seals or packings could be positioned in the recesses 40 and 42 depending upon the characteristics of the system. It should be noted that the O-rings 44 and 46 are sized so that in their normal uncompressed state they extend outwardly beyond both the end faces and the outer side wall of the sleeve 38. Thus, when positioned in the through-passage 14, the O-rings 44 and 46 serve to form a fluid seal between the central or main body portions 12 and the end fittings 20 and 22. This prevents any fluid leakage between the mating surfaces of the main body and the end fittings. Additionally, the O-rings provide a seal between the internal cylindrical surface of the through-passage 14 and the outer surface of the sleeve 38. This prevents fluid from flowing between the inner wall of the through-passage 14 and the outer wall of the sleeve 38.

Located at one end of the sleeve 38 is a radially inwardly extending shoulder or flange 48. The flange 48 provides means for positioning or locating the filter or strainer elements of the cartridge. In the embodiment of FIG. 2, the cartridge is positioned in the central body section 12 for flow from the right to the left (as viewed in FIG. 2). The filter elements in this embodiment comprise a pair of screen members 50 and 52 which are identical in general configuration except that the first element in the direction of flow, i.e., element 52, is, of course, of somewhat coarser mesh than element 50. Referring particularly to element 50, it will be seen that it is a corrugated disc of mesh which is joined about its periphery to a cylindrical sleeve or holder 54. The holder 54 is sized so as to be freely received within the bore 56 of sleeve 38. The screen member 52 is similarly constructed and mounted within a holder or sleeve 60 which has the same configuration as the holder 54. It should be noted that an O-ring seal 62 is mounted between the holders 60 and 54 so as to prevent fluid from bypassing the screens 50, 52. The two screen assemblies 50, 52 are axially held in position in the sleeve 38 by a bowed snap ring 64 which is received within a groove 66 formed about the interior of the sleeve 38.

Figure 4:
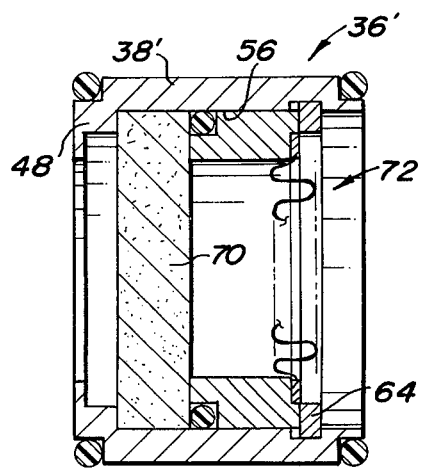

As discussed earlier, the arrangement of the filter unit is such that a great variety of different filter element combinations can be used. FIGS. 4–9 show typical examples of filter cartridges which can be used in the assembly shown in FIGS. 1–3. For example, in the FIG. 4 embodiment, the filter cartride 36' has a sleeve member 38' which is identical to the sleeve 38 of the FIG. 2 embodiment. In FIG. 4, however, the final filter element comprises a pad or disc formed, for example, from a suitable filter material such as a fibrous material or sintered metal. The disc 70 is sized so as to be received within the bore 56' of sleeve 38' and rest against the flange 48'. The disc 70 is held in position by the pre-filter unit 72 which is of identical construction to the filter 52 of FIG. 2. The pre-filter 72 and the final filter disc 70 are maintained in the sleeve 38' by a bowed snap ring 64' as described with reference to FIG. 2.

Figure 5:
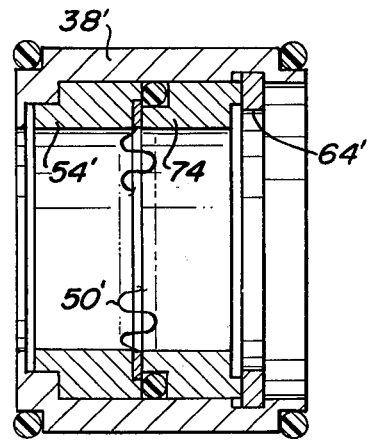

The modification shown in FIG. 5 is generally identical to the FIG. 2 embodiment. It does differ, however, in that no pre-filter element such as the mesh disc 52 is used. In this embodiment, only one filter disc 50' is used, and it and its holder 54' are held in position by an annular holder element 74 which is of the same size and shape as the holder element 54. Also, a bowed snap ring 64' locks the retainer 74 and the holder 54' in position in the sleeve 38'.

Figure 6:
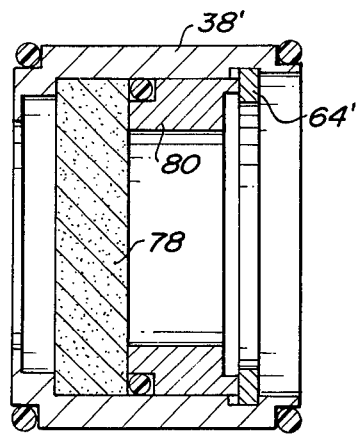

The FIG. 6 modification is similar to FIG. 4 in that it uses a filter disc 78 as the filter element. It does not have a pre-filter of the type used in FIG. 4 but, rather, merely has a retainer 80 which in combination with a bowed snap ring 64' locks the filter disc 78 in position in the sleeve 38'.

It should be noted that each of the filter cartridges of FIGS. 2, 4, 5 and 6 use the same sleeve member 38, 38'. The various combinations of filter elements illustrated can, of course, be varied or removed from the sleeves 38, 38' merely by removing the bowed snap ring. This permits wide variation in the filter combinations provided in any one cartridge sleeve 38, 38'. Additionally, all of the various types of filter cartridges can be used in the body assembly shown in FIGS. 1–3.

Figure 7:
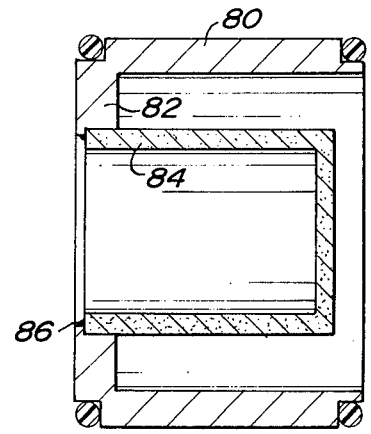

The FIG. 7 embodiment uses a slightly different outer sleeve 80. Sleeve 80 has a somewhat larger end flange 82 and includes a cup-shaped sintered metal filter element 84. The element 84 is received within the flange 82 and suitably connected thereto such as by brazing, welding or soldering at location 86.

Figure 8:
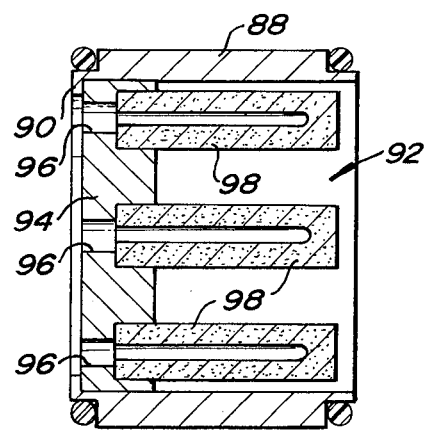

In the FIG. 8 embodiment, the cartridge comprises a sleeve 88 which has a relatively small end flange 80 that serves to retain a filter pack 92. In this embodiment, the filter pack 92 includes a metal disc 94 having a plurality of spaced openings 96 extending therethrough. At the right-hand side of disc 94, the openings 96 are counterbored and receive sintered metal filter elements 98. It should be appreciated that any number and size of the filter elements 98 can be used in a cartridge of this particular type.

Figure 9:
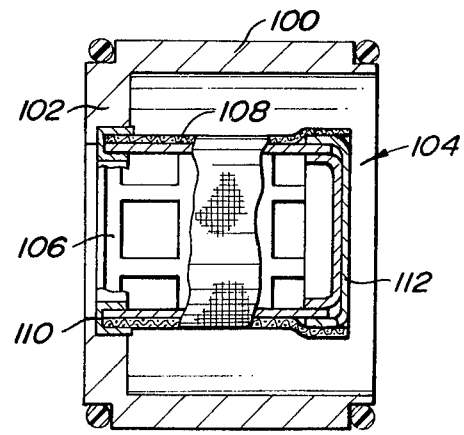

In FIG. 9, a further cartridge modification is illustrated which uses a sleeve 100 which has a relatively large end flange 102. A composite cup-shaped filter element 104 is suitably connected within the flange 102. The filter element 104 comprises a perforated sheet metal sleeve 106 about which a filter screen 108 is wrapped. A U-shaped end member 110 clamps the left-hand end of the element 104 together. At the opposite end, a filter screen and a perforated metal cap are welded on opposite sides of the sheet metal cylinder 106.

The invention has been described in great detail sufficient to enable one of ordinary skill in the art to make and use the same. Obviously, modifications and alterations of the preferred embodiment will occur to others upon a reading and understanding of the specification and it is our intention to include all such modifications and alterations as part of our invention insofar as they come within the scope of the appended claims.

What is claimed is:

1. A fluid filter comprising:

a main body member having oppositely disposed, generally planar end faces with a cylindrical through-passage extending through said body portion between said end faces;

a pair of end fitting members positioned adjacent to said main body member at opposite ends of said through-passage, each said end fitting member having a through-opening generally aligned with said through-passage to define inlet and outlet openings;

connecting plural members extending between said end fittings for releasably clamping said end fittings and main body member together, whereby removal of only one of said connecting members ultimately permits outward pivoting of said main body member about one of said connecting members which has not been removed;

a filter cartridge positioned in said main body member through-passage, said filter cartridge comprising (1) a hollow open-ended cylindrical sleeve having inner and outer surfaces and an outer diameter dimensioned such that said sleeve is closely and slidably received in said through-passage and (2) at least one fluid filter element operably mounted within said sleeve and positioned therein such that all fluid passing through said fluid filter from said inlet opening to said outlet opening will pass through said filter element;

means for positively retaining said filter cartridge in a desired position in said main body member through-passage when said pair of end fittings are clamped to said main body member at opposite ends of said through-passage, said retaining means permitting said filter cartridge to be axially removed from either end of said through-passage when at least the end fitting member associated with that end is removed therefrom; and, seal elements positioned circumferentially about the ends of said sleeve to provide a fluid seal between the outer surface of said sleeve and said through-passage and to provide a fluid seal between said end fittings and said main body member.

2. The fluid filter as defined in claim 1 wherein said sleeve includes circumferential recesses formed about its opposite ends; and, wherein said seal elements comprise O-rings positioned in said recesses and sized to extend outwardly of both the end and external surface of said sleeve.

3. The fluid filter as defined in claim 1 wherein the side wall of said sleeve is formed from a fluid impervious material.

4. The fluid filter is defined in claim 1 wherein said sleeve includes a radially inwardly extending flange having a pair of side surfaces connected by a generally cylindrical surface and wherein said fluid filter is held in position against said flange.

5. The fluid filter as defined in claim 4 wherein said filter element comprises a cup-shaped member tightly received within the cylindrical connecting surface of said flange.

6. The fluid filter as defined in claim 4 wherein said filter element is clamped adjacent a side surface of said flange.

7. The fluid filter as defined in claim 4 wherein said filter element is clamped by a spring member received in a groove formed in said sleeve.

8. The fluid filter as defined in claim 1 wherein said retaining means comprises a shoulder defined at the interface between each end fitting and said main body member, said shoulder extending radially inward from the wall of said main body member through-passage with said filter cartridge being captured in said through-passage between said shoulders.

9. The fluid filter as defined in claim 8 wherein said sleeve has a length substantially equal to the length of said main body member with the end faces of said sleeve positively captured between said shoulders to prevent axial movement of said filter cartridge in said through-passage.

* * * * *